G. M. TABER.
COLLAPSIBLE TOP FOR VEHICLES.
APPLICATION FILED JULY 19, 1919.
1,334,568.
Patented Mar. 23, 1920.
2 SHEETS—SHEET 1.
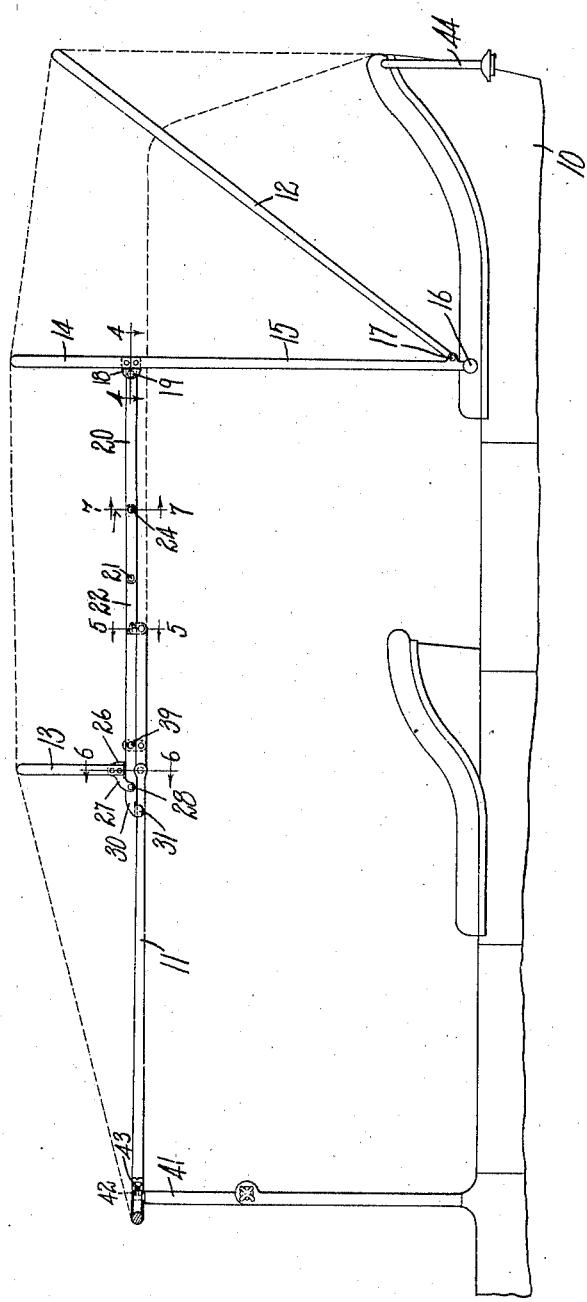
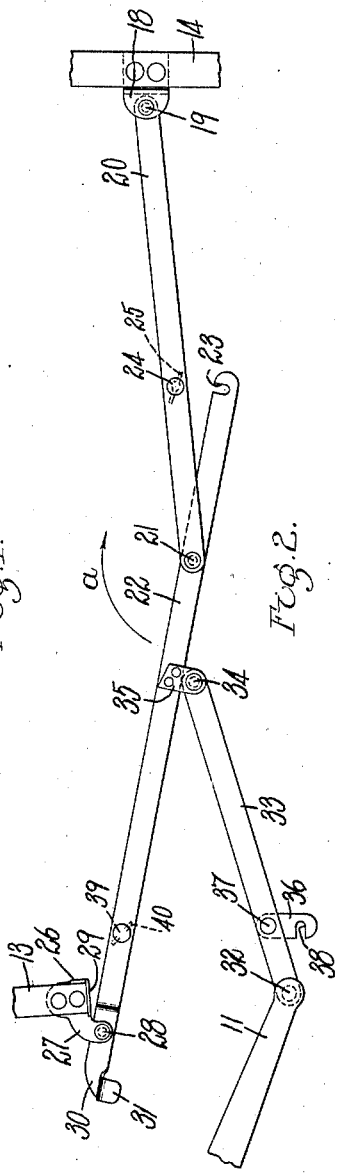
Fig. 1.
Fig. 2.
Inventor:
George M. Taber,
by his attorney,
Charles S. Gooding.

G. M. TABER.
COLLAPSIBLE TOP FOR VEHICLES.
APPLICATION FILED JULY 19, 1919.
1,334,568.
Patented Mar. 23, 1920.
2 SHEETS—SHEET 2.
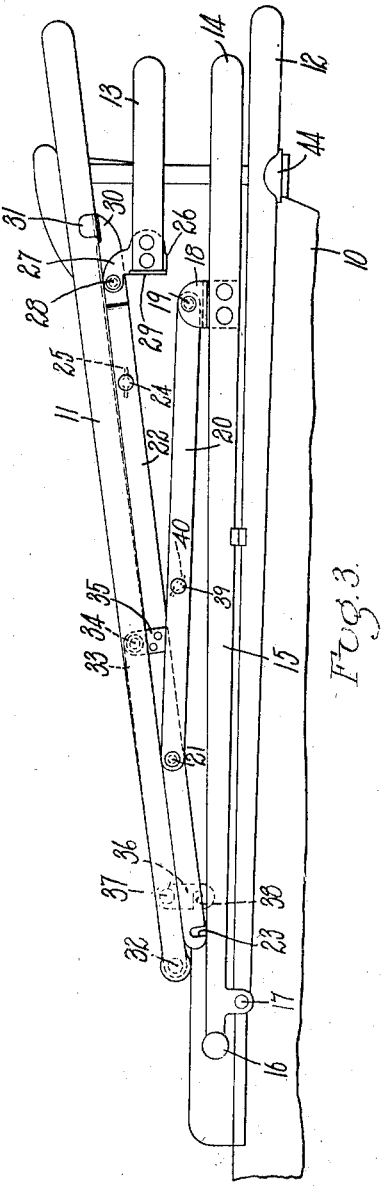
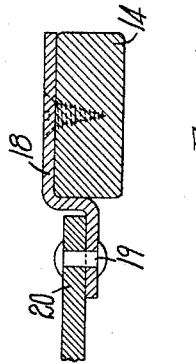
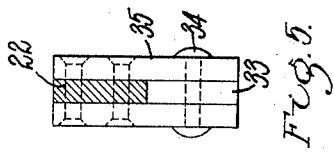
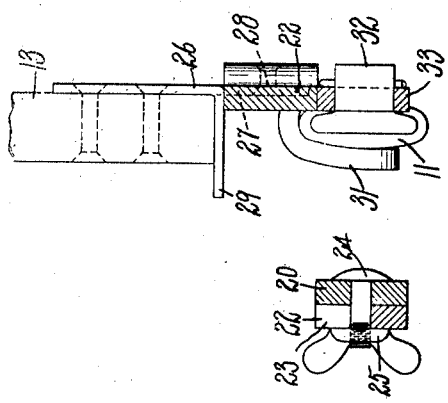
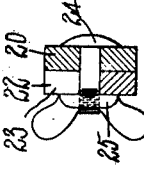
Inventor:
George M. Taber,
by his attorney,
Charles S. Gooding.

UNITED STATES PATENT OFFICE.

GEORGE M. TABER, OF LOWELL, MASSACHUSETTS.

COLLAPSIBLE TOP FOR VEHICLES.

1,334,568. Specification of Letters Patent. Patented Mar. 23, 1920.

Application filed July 19, 1919. Serial No. 311,923.

*To all whom it may concern:*

Be it known that I, GEORGE M. TABER, a citizen of the United States, residing at Lowell, in the county of Middlesex and State of Massachusetts, have invented new and useful Improvements in Collapsible Tops for Vehicles, of which the following is a specification.

This invention relates to collapsible tops for vehicles, such as automobiles.

The object of the invention is to provide a cheap and simple top for an automobile and one which can be operated to be extended or collapsed by one man and which when so extended or collapsed will be firmly positioned upon the vehicle.

The object of the invention is further to provide a device of the character set forth which can be easily applied to automobiles already manufactured such, for example, as the Ford automobile.

The invention consists in the combination and arrangement of parts set forth in the following specification and particularly pointed out in the claims thereof.

Referring to the drawings:

Figure 1 is a side elevation of a portion of an automobile with my improved top attached thereto, the fabric of the top being indicated in dotted lines.

Fig. 2 is a side elevation of the mechanism for collapsing the top and for holding the top extended.

Fig. 3 is a side elevation of a portion of a car with the top collapsed, the fabric of the top being omitted.

Fig. 4 is an enlarged sectional plan taken on the line 4—4 of Fig. 1.

Fig. 5 is a detailed sectional elevation taken on the line 5—5 of Fig. 1.

Fig. 6 is a detailed sectional elevation taken on the line 6—6 of Fig. 1.

Fig. 7 is a detailed section taken on the line 7—7 of Fig. 1.

Like numerals refer to like parts throughout the several views of the drawings.

In the drawings, 10 is the body of an automobile of well-known construction. 11 is the front bow of the top of said automobile. 12 is the rear bow. 13 is the intermediate front bow, and 14 the intermediate rear bow. The front bow 11, when the top is extended, is in a horizontal position, the bows 13 and 14 are in a vertical position, and the bow 12 is in a rearwardly inclined position. The intermediate rear bow 14 has oppositely disposed vertical sides 15 which extend downwardly and are pivoted at 16 to opposite sides of the body 10. The rear bow 12 is pivoted at 17 to the vertical side bars 15 of the intermediate rear bow 14, all in a manner well known to those skilled in this art.

The mechanism whereby the top is held in either an extended or collapsed position will now be explained. It being understood that the mechanism hereinafter explained is duplicated on opposite sides of the top, the explanation of one side being sufficient for a complete understanding of the whole device.

A bracket 18 is rigidly fastened to the intermediate rear bow 14 and forms in effect a portion thereof. To said bracket 18 is pivoted at 19 an arm 20 and to the front end of said arm at 21 is pivoted a bar 22. The rear end of the bar 22 is extended rearwardly beyond the pivot 21 and is provided in its upper edge with a notch 23 which is adapted to engage a clamp bolt 24 mounted upon the arm 20. Said clamp bolt 24 extends into the notch 23 and is tightened to clamp the bar 22 to the arm 20 by a clamp nut 25 when the parts of the device are in extended position.

The intermediate front bow 13 has a bracket 26 fastened to its lower end and forming in effect a part thereof; said bracket has a forwardly extending arm 27 which is pivoted at 28 to the bar 22 adjacent its front end. The bracket 26 also has a laterally extending flange 29 thereon which when the parts are in extended position rests upon the upper edge of the bar 22. The bar 22 has a forwardly extended portion 30 provided with an ear 31 which when the parts are extended rests upon the bow 11. The bow 11 is pivotally connected at 32 to a link 33 which at its rear end is pivoted at 34 to ears 35 rigidly fastened to the bar 22 and forming, in effect, a portion thereof. The ears 35 are located intermediate the point where the arms 20 and the bow 13 are pivotally attached to the bar 22. The link 33 is adapted to be fastened to the bar 22 when the parts are in extended position by a latch 36 that is pivoted at 37 to the link 33 and is provided with a notch 38 adapted to be engaged by a clamp bolt 39 mounted on the bar 22 having a clamp nut 40 in screw-threaded engagement therewith, whereby the latch 36 may be clamped to the bar 22 and thus the link 33 is locked to the bar 22 when the parts are in extended position.

It will be noted that the front end of the bar 22 overlaps the bow 11 and engages said bow in advance of the point where said bar is pivoted, as at 32, to the link 33 when the parts are in extended position and that said front end of the bar 22 engages the bow 11 both when the parts are in extended position and also when the top is collapsed. The front end portion of the bow 11 is fastened to the wind shield frame 41 by a clamp bolt 42 and nut 43 in a manner well known to those skilled in this art. A supporting arm 44 which is fast to the body 10 is engaged by the rear bow 12 when the parts are in collapsed position.

The operation of the device hereinbefore specifically described is as follows: Assuming the parts to be in the relative positions illustrated in Fig. 1 and that it is desired to throw the top back or collapse the same, the front end of the front bow is disconnected from the wind shield frame 41 by loosening the nuts 43 upon the clamp bolts 42. The front bow is thus disconnected from the wind shield frame. The clamp nuts 25 and 40 are then loosened and the latches 36 disconnected from their respective clamp bolts 39. The frame is then partially collapsed on the opposite sides of the top by pulling downwardly upon the bars 22 which throws the parts of the device into the relative positions illustrated in Fig. 2, wherein the top is partially collapsed. The top is then pushed rearwardly, whereupon the rear bow 12 will drop from an inclined to a horizontal position and the opposite sides thereof will rest upon the supports 44. The intermediate bows and the side bars 15 will drop downwardly into a horizontal position just above the rear bow 12 also as illustrated in Fig. 3. The bars 22 will be rotated upon their pivots 21 in the direction of the arrow $a$, Fig. 2, until they assume a reversed position from that illustrated in Figs. 1 and 2 as shown in Fig. 3. During this movement of the device the links 33 will also be carried over in the direction of the arrow $a$ and assume the position illustrated in Fig. 3 and above the bars 22, while the bow 11 will also be rotated in the direction of the arrow $a$ about its pivot 22 on the link 33 and will assume the inclined position illustrated in Fig. 3 above the other parts of the device and resting upon the ends 30 of the bars 22.

To extend the top the front bow 11 is pulled upwardly and forwardly and the other parts are extended to again assume the positions illustrated in Fig. 2. The bars 22 are then pushed upwardly until the notches 23 on said bars engage the clamp bolts 24. The clamp nuts 25 are then tightened, the latches 36 are then swung upwardly until the notches 38 engage the clamp bolts 39 and the clamp nuts 40 are then tightened. The front end of the bow 11 is then pulled downwardly into engagement with the upper end of the wind shield frame and locked in position by means of the clamp bolts 42 and nuts 43. The device is then in the position illustrated in Fig. 1 and is locked firmly in that position.

Having thus specifically described my invention what I claim and desire by Letters Patent to secure is:

1. A collapsible vehicle top having, in combination, a front bow, a rear bow, an intermediate front bow and an intermediate rear bow, an arm pivoted at its rear end to one of said rear bows, a bar pivoted adjacent its rear end to the front end of said arm and adjacent its front end to said intermediate front bow, and a link connecting said front bow to said bar intermediate the points where said bar is pivoted to said arm and intermediate front bow.

2. A collapsible vehicle top having, in combination, a front bow, a rear bow, an intermediate front bow and an intermediate rear bow, an arm pivoted at its rear end to said intermediate rear bow, a bar pivoted adjacent its rear end to the front end of said arm and adjacent its front end to said intermediate front bow, a link connecting said front bow to said bar intermediate the points where said bar is pivoted to said arm and intermediate front bow, and means to lock said bar to said arm.

3. A collapsible vehicle top having, in combination, a front bow, a rear bow, an intermediate front bow and an intermediate rear bow, an arm pivoted at its rear end to said intermediate rear bow, a bar pivoted adjacent its rear end to the front end of said arm and adjacent its front end to said intermediate front bow, a link connecting said front bow to said bar intermediate the points where said bar is pivoted to said arm and intermediate front bow, and means to lock said link to said bar.

4. A collapsible vehicle top having, in combination, a front bow, a rear bow, an intermediate front bow and an intermediate rear bow, an arm pivoted at its rear end to said intermediate rear bow, a bar pivoted adjacent its rear end to the front end of said arm and adjacent its front end to said intermediate front bow, and a link connecting said front bow to said bar intermediate the points where said bar is pivoted to said arm and intermediate front bow, the front end of said bar extending forwardly beyond its point of connection with said intermediate front bow and adapted to engage said front bow.

5. A collapsible vehicle top having, in combination, a front bow, a rear bow, an intermediate front bow and an intermediate rear bow, an arm pivoted at its rear end to said intermediate rear bow, a bar pivoted adjacent its rear end to the front end of said arm and adjacent its front end to said intermediate front bow, and a link connecting said front bow to said bar intermediate the points where said bar is pivoted to said arm and intermediate front bow, the front end of said bar extending forwardly beyond its point of connection with said intermediate front bow and adapted to engage said front bow when said top is extended and when said top is collapsed.

6. A collapsible vehicle top having, in combination, a front bow, a rear bow, an intermediate front bow and an intermediate rear bow, an arm pivoted at its rear end to said intermediate rear bow, a bar pivoted adjacent its rear end to the front end of said arm and adjacent its front end to said intermediate front bow, a link connecting said front bow to said bar intermediate the points where said bar is pivoted to said arm and intermediate front bow, said bar extending rearwardly beyond the point where it is pivoted to said arm, and means to fasten said extended portion of said bar to said arm.

In testimony whereof I have hereunto set my hand.

GEORGE M. TABER.